United States Patent
Van Phan et al.

(10) Patent No.: US 11,044,637 B2
(45) Date of Patent: Jun. 22, 2021

(54) MULTI-CELL ALLOCATION

(71) Applicant: Nokia Technologies Oy, Espoo (FI)

(72) Inventors: Vinh Van Phan, Oulu (FI); Hannu Petri Hietalahti, Kiviniemi (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 89 days.

(21) Appl. No.: 16/336,060

(22) PCT Filed: Sep. 27, 2016

(86) PCT No.: PCT/FI2016/050672
§ 371 (c)(1),
(2) Date: Mar. 22, 2019

(87) PCT Pub. No.: WO2018/060538
PCT Pub. Date: Apr. 5, 2018

(65) Prior Publication Data
US 2019/0281616 A1    Sep. 12, 2019

(51) Int. Cl.
*H04W 28/16* (2009.01)
*H04W 12/08* (2021.01)
*H04W 72/12* (2009.01)
*H04W 72/04* (2009.01)

(52) U.S. Cl.
CPC ........ *H04W 28/16* (2013.01); *H04W 12/08* (2013.01); *H04W 72/1263* (2013.01); *H04W 72/048* (2013.01)

(58) Field of Classification Search
None
See application file for complete search history.

(56) References Cited

U.S. PATENT DOCUMENTS 8,478,886 B2 *   7/2013   Deshpande ............ H04L 65/80
                                                                709/228
8,498,267 B2     7/2013   Choi-Grogan et al.
8,861,387 B2    10/2014   Wan et al.
(Continued)

FOREIGN PATENT DOCUMENTS

EP   2816853 A1    12/2014
WO   2013/169173 A1  11/2013
WO   2014/089051 A1   6/2014

OTHER PUBLICATIONS

Avocanh et al., "A Semi-Persistent Scheduling Scheme for Videotelephony Traffics in the Uplink of LTE Networks", Proceedings of the 17th ACM international Conference on Modeling, Analysis and Simulation of Wireless and Mobile Systems, Sep. 21-26, 2014, pp. 321-325.

(Continued)

*Primary Examiner* — Bunjob Jaroenchonwanit
(74) *Attorney, Agent, or Firm* — Squire Patton Boggs (US) LLP (57) ABSTRACT

According to an example aspect of the present invention, there is provided an apparatus comprising a memory configured to store allocation information, and at least one processing core configured to process resource allocation information received from a network, the resource allocation information defining a multi-cell scheduling allocation, and cause communication of information using the multi-cell scheduling allocation in a first cell and in a second cell.

20 Claims, 7 Drawing Sheets

(56) References Cited

U.S. PATENT DOCUMENTS

| | | | |
|---|---|---|---|
| 9,357,460 B2 | 5/2016 | Yamada | |
| 9,451,522 B2 | 9/2016 | Timus et al. | |
| 9,596,684 B2* | 3/2017 | Lin | H04W 4/08 |
| 9,730,134 B2* | 8/2017 | Yilmaz | H04W 8/005 |
| 10,708,851 B2* | 7/2020 | Karaki | H04W 74/0816 |
| 10,735,057 B1* | 8/2020 | Zhao | H04W 72/0446 |
| 2008/0293414 A1* | 11/2008 | Lin | H04M 1/72519 |
| | | | 455/435.2 |
| 2009/0275334 A1 | 11/2009 | Xie et al. | |
| 2011/0058670 A1* | 3/2011 | Ala-Laurila | H04W 12/001 |
| | | | 380/247 |
| 2013/0165130 A1 | 6/2013 | Wu et al. | |
| 2013/0281105 A1* | 10/2013 | Ren | H04W 28/26 |
| | | | 455/452.1 |
| 2014/0219244 A1 | 8/2014 | Prakash et al. | |
| 2014/0286305 A1 | 9/2014 | Yamada | |
| 2014/0349660 A1 | 11/2014 | Abdalla | |
| 2015/0009853 A1 | 1/2015 | Wan et al. | |
| 2015/0264620 A1 | 9/2015 | Timus et al. | |
| 2015/0271727 A1 | 9/2015 | Harrang | |
| 2015/0281940 A1* | 10/2015 | Yu | H04W 8/02 |
| | | | 455/456.1 |
| 2016/0044702 A1* | 2/2016 | Centonza | H04W 16/14 |
| | | | 370/328 |
| 2016/0081114 A1* | 3/2016 | Jung | H04W 72/04 |
| | | | 370/329 |
| 2016/0100412 A1* | 4/2016 | Shin | H04W 72/082 |
| | | | 370/336 |
| 2016/0119840 A1* | 4/2016 | Loehr | H04L 1/1822 |
| | | | 370/331 |
| 2016/0127069 A1* | 5/2016 | Nuss | H04L 1/1812 |
| | | | 370/329 |
| 2017/0230153 A1* | 8/2017 | Gao | H04W 72/1226 |
| 2017/0279580 A1* | 9/2017 | Chen | H04L 5/0048 |
| 2017/0290041 A1* | 10/2017 | Rico Alvarino | H04W 72/1268 |
| 2018/0110063 A1* | 4/2018 | Fan | H04W 72/0446 |
| 2018/0279403 A1* | 9/2018 | Kim | H04W 76/15 |
| 2018/0324862 A1* | 11/2018 | Mallick | H04W 72/06 |
| 2019/0036746 A1* | 1/2019 | Hwang | H04L 1/0061 |
| 2019/0037555 A1* | 1/2019 | Kim | H04W 72/0413 |
| 2019/0098533 A1* | 3/2019 | Babaei | H04W 72/0413 |
| 2019/0132881 A1* | 5/2019 | Byun | H04W 72/14 |
| 2019/0141777 A1* | 5/2019 | Kim | H04L 1/18 |
| 2019/0215114 A1* | 7/2019 | Van Der Velde | H04L 5/0032 |
| 2019/0215800 A1* | 7/2019 | Fujishiro | H04W 68/00 |
| 2019/0230578 A1* | 7/2019 | Karaki | H04W 72/1242 |
| 2019/0239172 A1* | 8/2019 | Hampel | H04W 56/0065 |
| 2019/0313379 A1* | 10/2019 | Lee | H04W 72/0453 |
| 2019/0320396 A1* | 10/2019 | Bagheri | H04W 52/346 |
| 2019/0364559 A1* | 11/2019 | Han | H04W 52/346 |
| 2019/0373524 A1* | 12/2019 | Kim | H04W 4/46 |
| 2020/0053823 A1* | 2/2020 | Mildh | H04W 68/005 |
| 2020/0112875 A1* | 4/2020 | Peng | H04W 28/0263 |
| 2020/0154467 A1* | 5/2020 | Gong | H04W 24/08 |
| 2020/0245265 A1* | 7/2020 | Dinan | H04W 52/365 |

OTHER PUBLICATIONS

International Search Report and Written Opinion received for corresponding Patent Cooperation Treaty Application No. PCT/FI2016/050672, dated Jan. 24, 2017, 14 pages.

"Challenges in the Uplink to Support Dual Connectivity", 3GPP TSG-RAN Working Group 2 meeting #82, R2-131986, Agenda: 7.2.1, Intel Corporation, May 20-25, 2013, pp. 1-7.

Extended European Search Report received for corresponding European Patent Application No. 16917590.8, dated Mar. 24, 2020, 20 pages.

* cited by examiner

MULTI-CELL ALLOCATION

RELATED APPLICATION

This application was originally filed as PCT Application No. PCT/FI2016/050672, filed on 27 Sep. 2016.

FIELD

The present invention relates to management of allocations in cellular communication systems.

BACKGROUND

Cellular communication is conducted in a communication system that comprises cells. For example, the communication may be wireless communication in type. Cells may be controlled by base station, or access point, devices, such that a base station or access point may control one or more cells. In some cases, a single base station device may be configured to control cells operating in accordance with different technologies. Cellular communication networks may be integrated so as to comprise sub-networks that operate under different principles, for example, a core network may be arranged to interface with radio-access networks operating in accordance with wideband code division multiple access, WCDMA, and long term evolution, LTE, technologies. 5G technology is a further example.

Wireless transmission of information takes place over certain wireless resources. Examples of resources include channels, spreading codes and timeslots, and combinations thereof. A device seeking to transmit information may request wireless resources, responsively receive an allocation of wireless resources and then use these resources to transmit the information.

Wireless resources may be allocated dynamically, persistently or semi-persistently. Dynamic allocation of resources may comprise that a resource block is allocated for single use, for example, for one timeslot or subframe. Dynamic allocation is efficient for infrequent and/or irregularly occurring transmissions of information. Persistent allocation may comprise allocating a resource block until further notice, which may be useful for providing a subset of system resources for subletting, for example to convey a permanent corporate data connection. Persistent allocation is efficient for predictable, durable communication needs.

Semi-persistent scheduling may comprise that resources are allocated to a node, such that the node may use the resources as long as it has information to transmit. In case the resources are unused for a period of time, the semi-persistent allocation may be cancelled by the network.

In semi-persistently allocated communication, in case of a transmission error that is detected, for example using error control coding, a re-transmission may be handled using dynamic allocation. In general, once a mobile enters a cell, it may attach to the cell and then request resources for use once the attachment is complete.

SUMMARY OF THE INVENTION

The invention is defined by the features of the independent claims. Some specific embodiments are defined in the dependent claims.

According to a first aspect of the present invention, there is provided an apparatus comprising a memory configured to store allocation information, and at least one processing core configured to process resource allocation information received from a network, the resource allocation information defining a multi-cell scheduling allocation, and cause communication of information using the multi-cell scheduling allocation in a first cell and in a second cell.

Various embodiments of the first aspect may comprise at least one feature from the following bulleted list:
- the resource allocation information defines a semi-persistent multi-cell scheduling allocation
- the resource allocation information defines a first routing path and a second routing path, and the apparatus is configured to use the first routing path in the first cell and the second routing path in the second cell
- the first routing path comprises a first path to a core network and the second routing path comprises a second path to the core network different from the first path to the core network
- the apparatus is configured to store a key and to use the key to access the second cell
- the key comprises at least one of: a layer-1 bit sequence, a layer 3 security credential, a user-equipment identity and a subscriber identity
- the apparatus is configured to trigger activation of the multi-cell scheduling allocation in the second cell by accessing the second cell with the key
- the at least one processing core is configured to determine, for the first cell and the second cell, scheduling resources at least partly based on the resource allocation information
- the resource allocation information defines scheduling resources to be at least partly common in the first cell and the second cell
- the resource allocation information defines first scheduling resources the apparatus is to use in the first cell, and wherein the resource allocation information defines second scheduling resources the apparatus is to use in the second cell.

According to a second aspect of the present invention, there is provided an apparatus comprising at least one processing core, at least one memory including computer program code, the at least one memory and the computer program code being configured to, with the at least one processing core, cause the apparatus at least to store a scheduling allocation concerning a user equipment at a time instant when the user equipment is not attached to a cell controlled by the apparatus, activate the scheduling allocation concerning the user equipment, and receive information from the user equipment, using scheduling resources defined by the scheduling allocation.

Various embodiments of the second aspect may comprise at least one feature from the following bulleted list:
- the apparatus is configured to activate the scheduling allocation responsive to receipt from the user equipment of a key indicating the user equipment is entering the cell controlled by the apparatus
- the apparatus is configured to activate the scheduling allocation responsive to receipt from a source base station device of an indication the user equipment is about to enter the cell controlled by the apparatus
- the apparatus is configured to provide a forward indication to a target base station device, that the user equipment is about to enter a cell controlled by the target base station device
- the apparatus is configured to provide a forward indication to a second-hop target base station device, that the user equipment is about to enter a cell controlled by the second-hop target base station device via at least one intermediate cell the apparatus is configured to provide a backward indication to a source base station device responsive to the user equipment entering the cell controlled by the apparatus from a cell controlled by the source base station.

According to a third aspect of the present invention, there is provided an apparatus comprising at least one processing core, at least one memory including computer program code, the at least one memory and the computer program code being configured to, with the at least one processing core, cause the apparatus at least to determine a multi-cell scheduling allocation for a user equipment, based at least partly on a sequence of cells the user equipment will traverse along a route of movement, cause the user equipment to be informed concerning the multi-cell scheduling allocation, and cause each base station controlling at least one cell affected by the multi-cell scheduling allocation to be informed concerning at least part of the multi-cell scheduling allocation.

In some embodiments of the third aspect, the multi-cell scheduling allocation comprises at least two data routing paths from base station devices to a core network.

According to a fourth aspect of the present invention, there is provided a method comprising processing resource allocation information received from a network, the resource allocation information defining a multi-cell scheduling allocation, and causing communication of information using the multi-cell scheduling allocation in a first cell and in a second cell.

Various embodiments of the fourth aspect may comprise at least one feature corresponding to a feature from the preceding bulleted list laid out in connection with the first aspect.

According to a fifth aspect of the present invention, there is provided a method comprising storing a scheduling allocation concerning a user equipment at a time instant when the user equipment is not attached to a cell controlled by an apparatus performing the method. activating the scheduling allocation concerning the user equipment, and receiving information from the user equipment, using scheduling resources defined by the scheduling allocation.

Various embodiments of the fifth aspect may comprise at least one feature corresponding to a feature from the preceding bulleted list laid out in connection with the second aspect According to a sixth aspect of the present invention, there is provided a method comprising determining a multi-cell scheduling allocation for a user equipment, based at least partly on a sequence of cells the user equipment will traverse along a route of movement, causing the user equipment to be informed concerning the multi-cell scheduling allocation, and causing each base station controlling at least one cell affected by the multi-cell scheduling allocation to be informed concerning at least part of the multi-cell scheduling allocation.

In some embodiments of the sixth aspect, the multi-cell scheduling allocation comprises at least two data routing paths from base station devices to a core network.

According to a seventh aspect of the present invention, there is provided an apparatus comprising means for storing resource allocation information, means for processing allocation information received from a network, the allocation information defining a multi-cell scheduling allocation, and means for causing communication of information using the multi-cell scheduling allocation in a first cell and in a second cell.

According to an eighth aspect of the present invention, there is provided an apparatus comprising means for storing a scheduling allocation concerning a user equipment at a time instant when the user equipment is not attached to a cell controlled by an apparatus performing the method, means for activating the scheduling allocation concerning the user equipment, and means for receiving information from the user equipment, using scheduling resources defined by the scheduling allocation.

According to a ninth aspect of the present invention, there is provided an apparatus comprising means for determining a multi-cell scheduling allocation for a user equipment, based at least partly on a sequence of cells the user equipment will traverse along a route of movement, means for causing the user equipment to be informed concerning the multi-cell scheduling allocation, and means for causing each base station controlling at least one cell affected by the multi-cell scheduling allocation to be informed concerning at least part of the multi-cell scheduling allocation.

According to a tenth aspect of the present invention, there is provided a non-transitory computer readable medium having stored thereon a set of computer readable instructions that, when executed by at least one processor, cause an apparatus to at least store resource allocation information process allocation information received from a network, the allocation information defining a multi-cell scheduling allocation, and cause communication of information using the multi-cell scheduling allocation in a first cell and in a second cell.

According to an eleventh aspect of the present invention, there is provided a non-transitory computer readable medium having stored thereon a set of computer readable instructions that, when executed by at least one processor, cause an apparatus to at least store a scheduling allocation concerning a user equipment at a time instant when the user equipment is not attached to a cell controlled by an apparatus performing the method, activate the scheduling allocation concerning the user equipment, and receive information from the user equipment, using scheduling resources defined by the scheduling allocation.

According to a twelfth aspect of the present invention, there is provided a non-transitory computer readable medium having stored thereon a set of computer readable instructions that, when executed by at least one processor, cause an apparatus to at least determine a multi-cell scheduling allocation for a user equipment, based at least partly on a sequence of cells the user equipment will traverse along a route of movement, cause the user equipment to be informed concerning the multi-cell scheduling allocation, and cause each base station controlling at least one cell affected by the multi-cell scheduling allocation to be informed concerning at least part of the multi-cell scheduling allocation.

According to a thirteenth aspect of the present invention, there is provided a computer program configured to cause a method in accordance with at least one of the fourth, fifth and sixth aspects to be performed.

According to a fourteenth aspect of the present invention, there is provided an apparatus comprising means for performing a method according to any of of the fourth, fifth and sixth aspects.

According to a fifteenth aspect of the present invention, there is provided a computer-readable medium encoded with instructions that, when executed by a computer, cause an apparatus to perform a method according to any of of the fourth, fifth and sixth aspects.

EMBODIMENTS

By defining a multi-cell scheduling allocation of wireless resources, a rapidly moving user equipment may gain access to resources in a plurality of cells without requesting such resources separately in each cell. If an expected route of movement of a user equipment, UE, is known in advance, cells the UE is likely to use when travelling along the route may be prepared with the multi-cell scheduling allocation in advance of the UE's arrival in these cells, and the UE, upon arrival, may simply activate the pre-existing allocation to access the resources in the cell. Further, the resources need not be the subject of an allocation process upon handover of the UE into the cell, which reduces delays associated with the handover.

Figure 1:
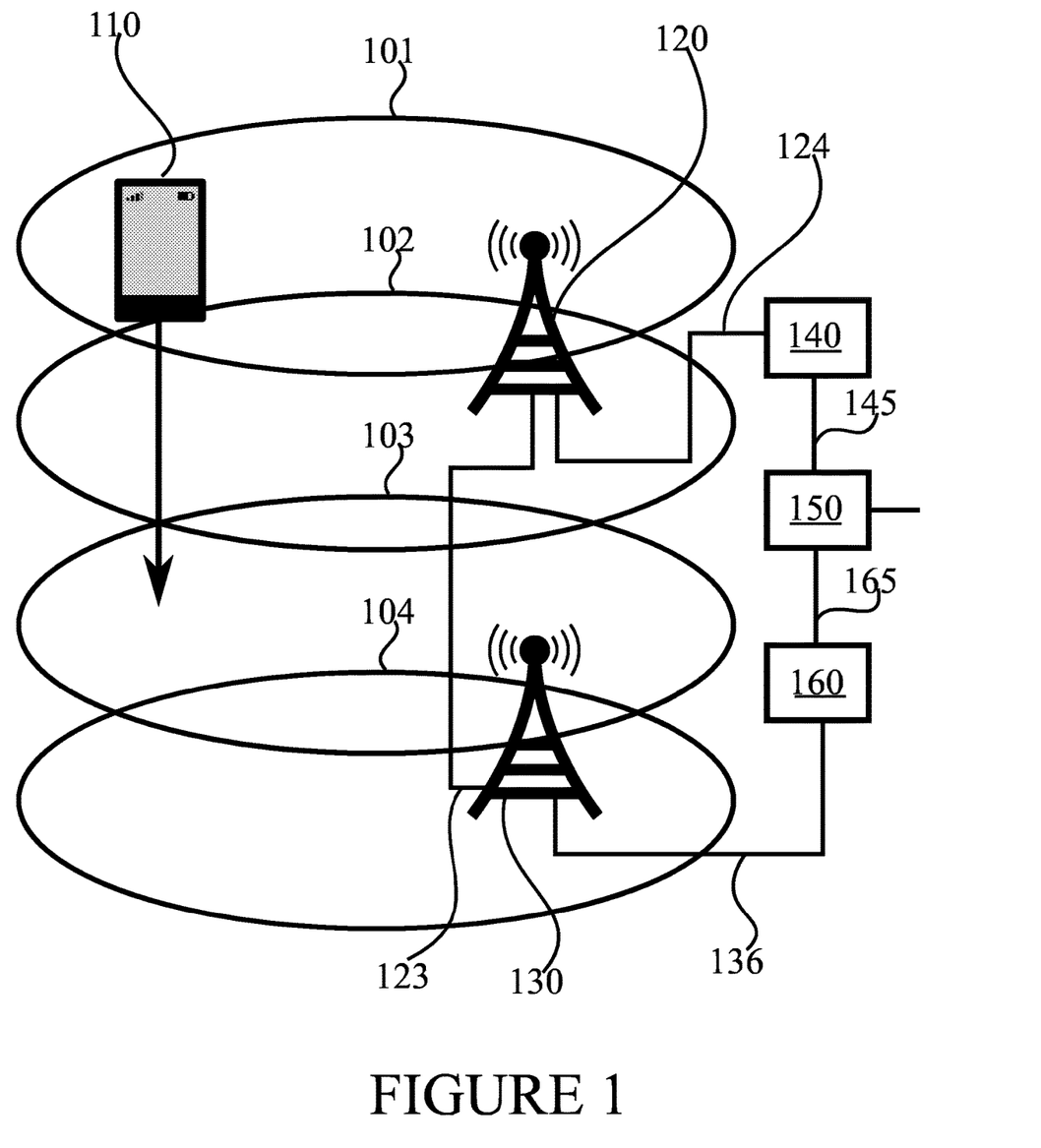
FIG. 1 illustrates an example system in accordance with at least some embodiments of the present invention.

FIG. 1 illustrates an example system in accordance with at least some embodiments of the present invention. UE 110 may comprise a user equipment, such as for example a smartphone, laptop or tablet computer, or a machine-type communication, MTC, UE. Examples of MTC UEs include camera nodes or more generally sensor nodes, which may be attachable to cars, aircraft or industrial elements, for example, to provide information therefrom. UE 110 is envisioned, in the example illustrated in FIG. 1, to move along a route indicated by a black arrow pointing downward from UE 110. In some embodiments, UE 110 is in general a user equipment the movement path of which is predictable, such as, for example, a UE in a car driven along a road.

UE 110 is in the situation of FIG. 1 disposed in an area served by cell 101, cell 101 being controlled by base station 120. Cell 101 and base station 120 may be configured to operate in accordance with a cellular technology, such as WCDMA, LTE or 5G, for example. In other embodiments, the technology may be one that is referred to as "non-cellular" in the art, such as wireless local area network, WLAN, or worldwide interoperability for microwave access, WiMAX. Devices controlling communication cells are herein referred to as base stations. This terminological choice is not meant to imply a limitation in scope, as devices referred to as access points may perform similar tasks and benefit from principles of the present invention. A wireless link may connect UE 110 to base station 120 to enable one-way or two-way communication. Communication from UE 110 to base station 120 is referred to as uplink communication, while communication in the other direction, from base station 120 to UE 110, is referred to as downlink communication. Communication may take place over channels, such as control channels to convey control information, such as resource allocation information, and data channels to convey payload information, such as media or application information.

Base station 120 is in communication, via connection 124, which may comprise a wire-line connection, for example, with first core network node 140. First core network node 140 may comprise a mobility management entity, MME, for example. First core network node 140 may be in communication with second core network node 150 via connection 145, which may comprise a wire-line connection, for example. Second core network node 150 may comprise another MME, or a server, for example. Second core network node 150 may be operatively connected with further core network nodes, such as gateways, for example, to enable forwarding of information to other networks.

Base station 120 may further be connected with base station 130 via an inter-base station connection 123. Where base station 120 and base station 130 are LTE base stations, this connection may take the form of an X2 connection, although other technologies may employ different terminology. The inter-base station connection is optional in the sense that it may be absent. In some cases, there may be connected base stations along the route taken by UE 110 that have connections to a next base station along the route, and there may be unconnected base stations along the route taken by UE 110 that lack direct connections to a next base station along the route.

Base station 130 is coupled with third core network node 160 via connection 136, which may comprise a wire-line connection, for example. Third core network node may be in communication with second core network node 150, or indeed another core network node, via connection 165. Base station 130 and cells 103 and 104, which it controls, may be arranged to operate in accordance with a same communication standard as base station 120.

As UE 110 moves along the route, denoted by the black arrow in FIG. 1, it will exit an area served by cell 101 and enter an area served by cell 102. A change of communication from one cell to the next is known as a handover. Since cell 101 and cell 102 are both controlled by base station 120, the handover from cell 101 to cell 102 may be handled by base station 120.

As UE 110 continues along its route, it will be handed over from cell 102 to cell 103, which is controlled by base station 130. Even further, UE 110 will hand over from cell 103 to cell 104, which is also controlled by base station 130.

Assuming UE 110 seeks to transmit a flow of information as it traverses the route, it may request, in each cell it enters, a scheduling allocation of resources it may use when transmitting from the cell it has recently entered. As the network responds by providing an allocation of resources, delay is incurred. If the cells are small and UE 110 is moving rapidly, the delay may degrade the transmission of the flow of information. Likewise, if UE 110 has a stable protocol connection as its handed from a source cell to a target cell, the network may be configured to arrange the target cell to provide a scheduling allocation for UE 110, such that once UE 110 arrived in the target cell, it can be provided an allocation of resources to continue the protocol connection. Also this alternative results in some delay, since the network signals to the target base station and the target base station responsively manages resource allocations.

In case the route of UE 110 is predictable, the network may determine a multi-cell scheduling allocation for UE 110, for use as UE 110 traverses the predictable route. The route may be predictable, for example, where UE 110 is attached to a Formula 1 racing car, in which case UE 110 will be driven at high speed along the length of a race track. Likewise, UE 110 may be attached to a helmet of a ski jumper, or under a wing of an aircraft as it takes off from a runway. In such cases, the route of UE 110 is predictable, and due to a high speed of UE 110 delays in arranging wireless resources in cells would advantageously be reduced.

A multi-cell scheduling allocation may comprise an explicit or implicit indication of resources allocated for UE 110 in more than one cell. In detail, a multi-cell scheduling allocation may comprise an explicit or implicit indication of resources allocated for UE 110 in more than two cells, more than three cells, more than four cells or more than five cells, for example. The multi-cell scheduling allocation may further comprise a semi-persistent scheduling, SPS, radio network temporary identifier, RNTI, and/or all associated UE contexts such as bearer service configurations necessary for making use of SPS allocation. For example, the multi-cell scheduling allocation may comprise an indication of allocated SPS period, scheduled transmission occasions, frequencies, spreading codes, timeslots and/or subframes, modulation and coding schemes that are common among at least two cells affected by the multi-cell scheduling allocation. Alternatively to common resources, the multi-cell scheduling allocation may comprise information that enables determination, in at least two cells, of resources allocated to UE 110. For example, the multi-cell scheduling allocation may comprise a list of cells, and for each cell, information identifying the resources allocated therein to UE 110. Thus, the multi-cell scheduling allocation may comprise a list of resources allocated for UE 110 in each cell affected, the listed resources not necessarily being the same in each cell. Thus UE 110, upon entry to a new cell affected by the multi-cell scheduling allocation, knows before the entry, which UE contexts and/or resources are allocated to it in the new cell, and UE 110 may at once begin using the allocated UE contexts and/or resources.

The multi-cell scheduling allocation may comprise, for example as part of UE contexts, information concerning data routing paths to a core network, such that from one or more than one cell in the group of cells the multi-cell scheduling allocation concerns, a data routing path to the core network is determinable from information in the multi-cell scheduling allocation. For example, in cells 101 and 102 the data routing path may be via base station 120 and first core network node 140, and in cells 103 and 104 the data routing path may be via base station 130, inter-base station connection 123, base station 120 and first core network node 140. In some embodiments, the data routing paths are selected in a way that switches of routing path are minimized, for example by using inter-base station connections such as X2 interfaces to keep data routing paths at least partly unchanged as UE 110 changes cell.

The multi-cell scheduling allocation may be determined in the network, for example in a core network node. In some embodiments, the multi-cell scheduling allocation is configured manually or partly manually by network operators, using the predicted route of UE 110. The core network node may query base stations when determining the multi-cell scheduling allocation, to discover resources available for allocation in cells controlled by base stations that the UE is foreseen to communicate with as it traverses the route. UE 110 may be informed of the multi-cell scheduling allocation, to enable UE 110 to use the resources thereby allocated when moving from cell to cell. A predicted route of user equipments may be determined from knowledge of a road network, for example, where highways and train tracks form predictable paths of movement. Knowledge of highways and train tracks may be dynamically gathered, for example by observing, by the network, patterns in UE movement. In case of trains, for example, a set of UEs may be determined to be co-moving, which renders the UEs comprised in the set as predictably moving. These UEs may be onboard the same train, for example.

Base stations controlling cells affected by the multi-cell scheduling allocation may be informed concerning the multi-cell scheduling allocation, at least to the extent the multi-cell scheduling allocation affects cells controlled by the base station in question. In other words, a base station need not be informed of the multi-cell scheduling allocation to the extent it concerns cells this base station doesn't control.

These base stations may be provided with information identifying, explicitly or implicitly, the resources allocated to UE 110 in the multi-cell scheduling allocation in at least one cell controlled by the base station. This information may comprise an indication it relates to a multi-cell scheduling allocation. This information may comprise an indication of a next base station in sequence in the multi-cell scheduling allocation, that UE 110 is predicted to attach to, as it proceeds along the route, after the base station receiving the information. Such a base station is a target base station in a handover process, as UE 110 leaves a cell controlled by the base station receiving the information. This information may also comprise a second-hop target base station, that UE 110 is predicted to attach to after the next base station in sequence.

A base station controlling a cell affected by the multi-cell scheduling allocation may be configured to provide to a next base station in the sequence, that is, a target base station, a forward indication UE 110 is incoming into a cell controlled by the target base station. This may be referred to as a first-hop forward indication. The target base station may responsive to such an indication activate the allocation of resources to UE 110 in its cell, in accordance with the multi-cell scheduling allocation. The first-hop forward indication may be triggered by a determination UE 110 approaches a cell edge, for example.

In some embodiments, a base station controlling a cell affected by the multi-cell scheduling allocation is configured to provide to a second-hop target base station, a forward indication UE 110 is incoming into a cell controlled by the second-hop target base station. Such an indication may be referred to as a second-hop forward indication. In these embodiments, the second-hop target base station may, for example, release from use by other UEs the resources allocated to UE 110 in the second-hop target base station in the multi-cell scheduling allocation responsive to the second-hop forward indication, and to activate their allocation to UE 110 responsive to the first-hop forward indication from a source base station. The source base station immediately precedes the second-hop target base station in the sequence of base stations. Forward indications may be communicated via inter-base station connections such as connection 123, for example, or via a core network.

In some embodiments, a base station controlling a cell affected by the multi-cell scheduling allocation is configured to provide to a source base station, a backward indication UE 110 has arrived into a cell controlled by the base station. The source base station, which precedes the base station transmitting the backward indication in the sequence of base stations, may responsive to the backward indication deactivate the allocation of resources to UE 110, since UE 110 is no longer served by the source base station. A backward indication may be provided responsive to receipt of a key from UE 110, for example.

Figure 2:
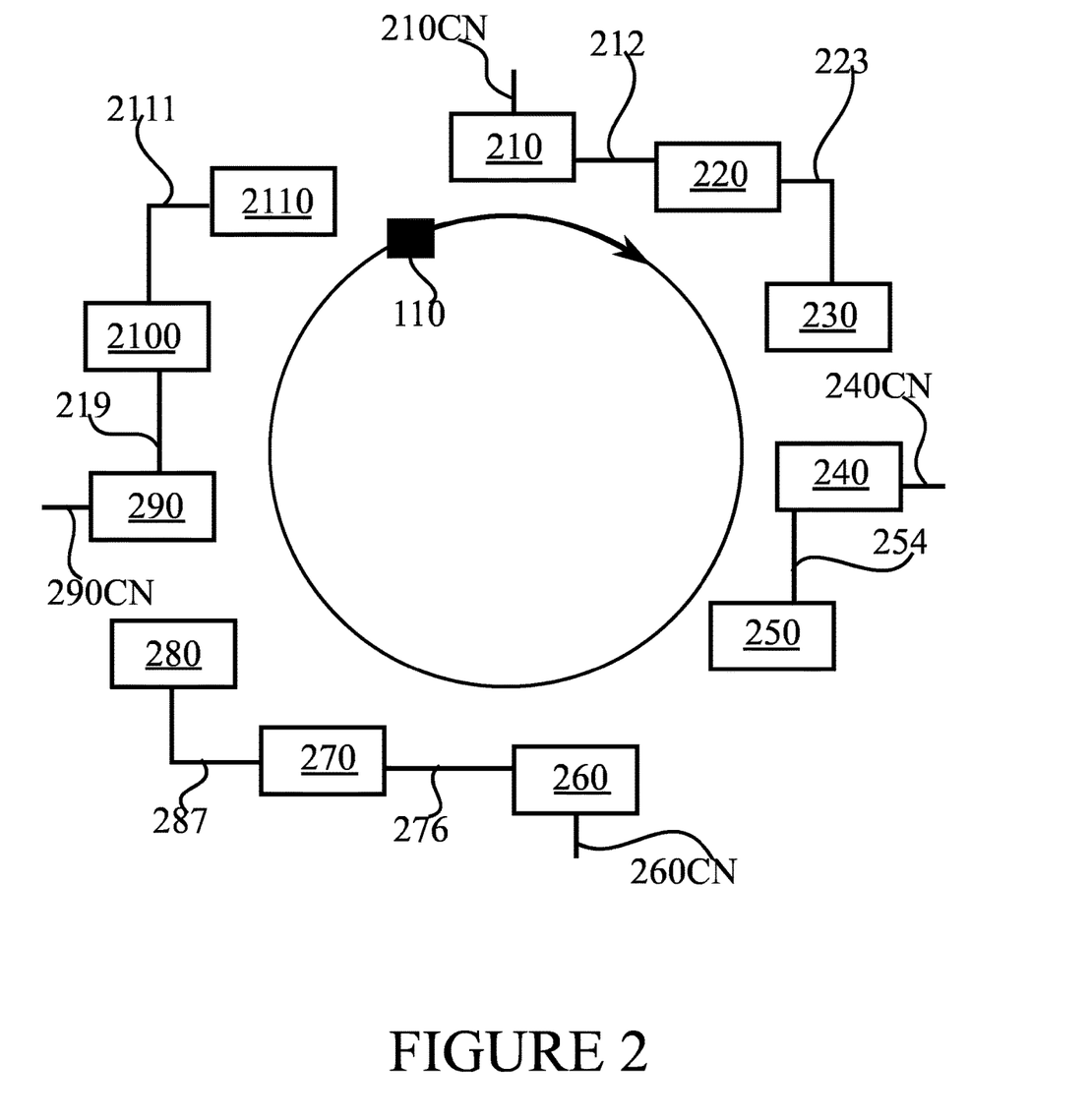
FIG. 2 illustrates an example system in with core network connections accordance with at least some embodiments of the present invention.

UE 110 may be provided, in connection with informing UE 110 of the multi-cell scheduling allocation, at least one key corresponding to one or more cells affected by the multi-cell scheduling allocation. UE 110 may use such a key in accessing a cell of the multi-cell scheduling allocation, such that a base station controlling the cell can responsively activate its part of the multi-cell scheduling allocation for UE 110. The key may comprise a layer-1 bit sequence, similar to a dedicated random access channel, RACH, preamble, for example. In an alternative, the key may comprise a layer 3 security credential passcode to be sent, for example, with radio resource control, RRC, signalling. More generally, any preconfigured security credential information may be used as a key, to obtain quick admission at a base station involved in the multi-cell scheduling allocation. For example, the layer 3 security credential and/or a UE or subscriber identity may be used FIG. 2 illustrates an example system in with core network connections accordance with at least some embodiments of the present invention. UE 110 corresponds to UE 110 of FIG. 1. In the system of FIG. 2, UE 110 moves along a circular, or more generally periodic, route in a direction denoted by an arrow. Along the route, base stations 210, 220, 230, 240, 250, 260, 270, 280, 290, 2100 and 2110 control cells UE 110 will use as it traverses the route. Base station 210 has core network connection 210CN, base station 240 has core network connection 240CN, base station 260 has core network connection 260CN, and base station 290 has core network connection 290CN.

Inter-base station connection 212 connects base station 210 with base station 220. Inter-base station connection 223 connects base station 220 with base station 230. Inter-base station connection 254 connects base station 250 with base station 240. Inter-base station connection 276 connects base station 270 with base station 260. Inter-base station connection 287 connects base station 280 with base station 270. Inter-base station connection 219 connects base station 2100 with base station 290. Inter-base station connection 2111 connects base station 2110 with base station 2100. The illustrated base stations may further have connections that are not represented in FIG. 2.

A multi-cell scheduling allocation may define data routing paths, in detail, which core network connection to use in phases of the route. In this example, UE 110 would use core network connection 210CN when in cells controlled by base stations 210, 220 and 230. Further, UE 110 would use core connection 240CN when in cells controlled by base stations 240 and 250. Further, UE 110 would use core connection 260CN when in cells controlled by base stations 260, 270 and 280. Further, UE 110 would use core connection 290CN when in cells controlled by base stations 290, 2100 and 2110. When using base station 230, for example, information transmitted from UE 110 would be routed to core network connection 210CN via inter-base station connections 223 and 212. In general, information may be routed via inter-base station connections to a base station that has the core network connection that is to be used.

A benefit is obtained by switching the core network connection less frequently than in connection with each base station change, as setup time of a core network connection is not needed when an already active core network connection is employed.

Figure 3:
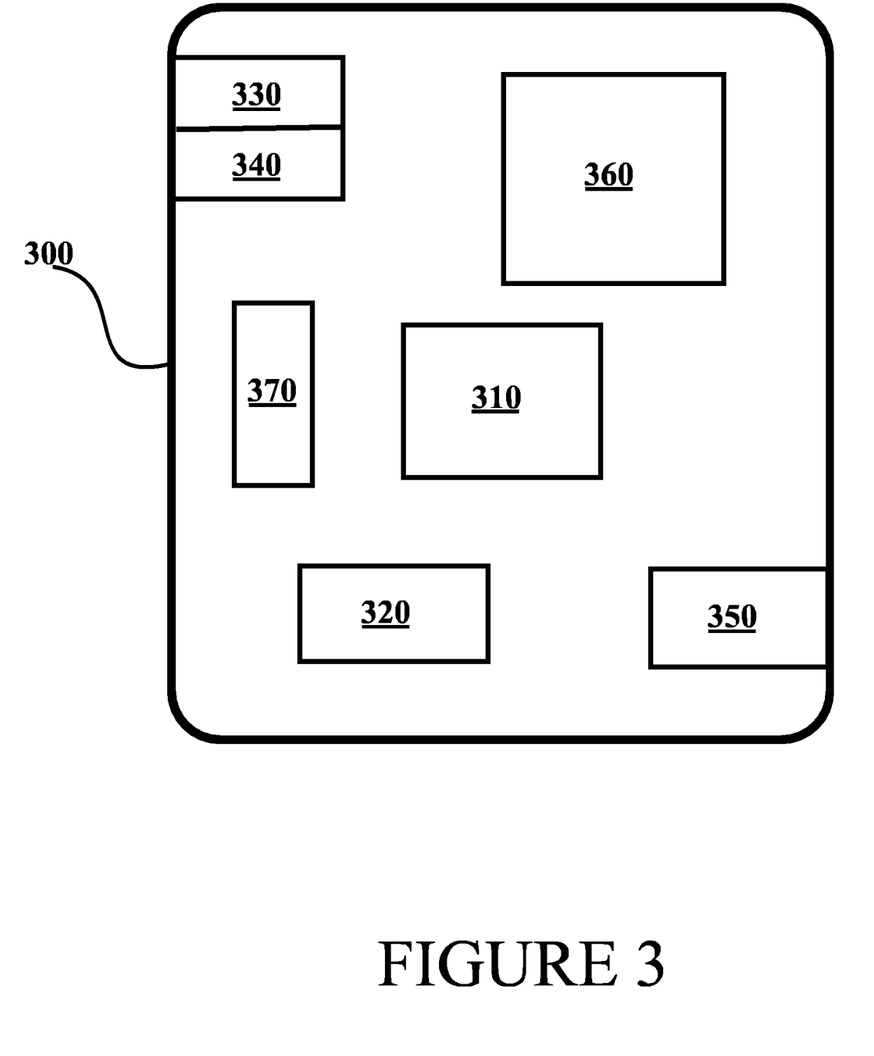
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 of FIG. 1 or FIG. 2. In applicable parts, device 300 may additionally or alternatively correspond to a base station or a core network device. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
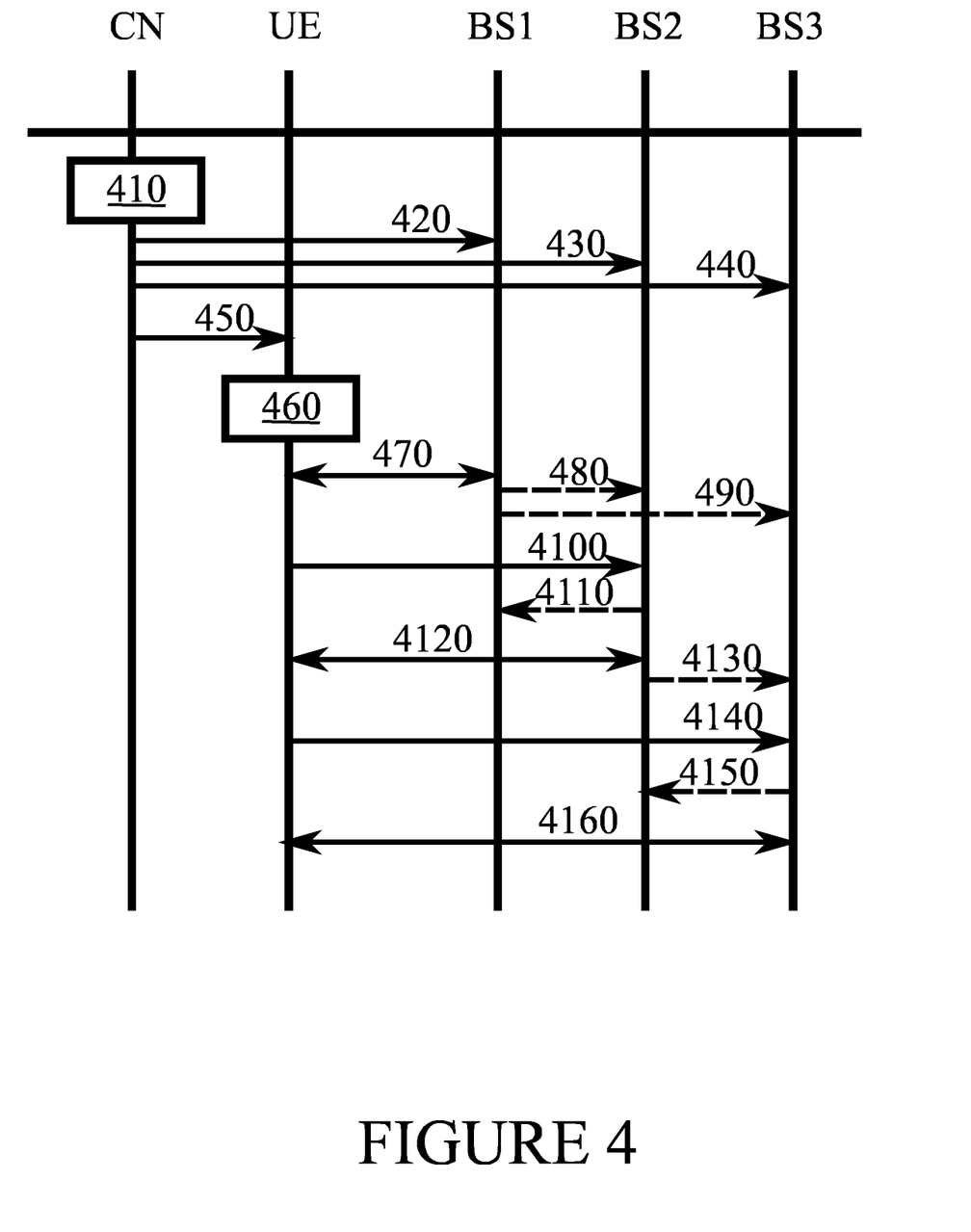
FIG. 4 illustrates signalling in accordance with at least some embodiments of the present invention.

FIG. 4 schematically illustrates signalling in accordance with at least some embodiments of the present invention. On the vertical axes are disposed, from the left to the right, core network node CN, user equipment UE, and base stations BS1, BS2 and BS3. Time advances from the top toward the bottom.

Initially, in phase 410, a multi-cell scheduling allocation is determined. As described above, this phase may comprise querying from the base stations concerning their resources that are available for allocation. Once the multi-cell scheduling allocation is determined, base stations BS1, BS2 and BS3 are informed concerning at least their respective parts of the allocation in phases 420, 430 and 440, respectively. Further, user equipment UE is informed concerning the multi-cell scheduling allocation in phase 450.

In phase 460, user equipment UE initiates a transmission session, which may comprise a continuous or regular transmission of content, such as, for example, media content, which may comprise high-resolution video content, for example. The transmission session is active between user equipment UE and base station BS1 in phase 470.

In phase 480, responsive to a determination in base station BS1 that user equipment UE is approaching an inter-base station handover to base station BS2, which is the first-hop target base station from base station BS1, base station BS1 transmits a first-hop forward indication to base station BS2. Similarly, base station BS1 may transmit as phase 490 a second-hop forward indication to base station BS3, which is the second-hop target base station from base station BS1. Base station BS2 may, responsive to the indication of phase 480, activate the allocation of resources to user equipment UE. Base station BS3 may, responsive to the indication of phase 490, release from use by other UEs the resources that it will provide to user equipment UE once the user equipment enters a cell controlled by base station BS3.

In phase 4100, user equipment UE accesses base station BS2 using a key provided in connection with informing the UE of the multi-cell scheduling allocation. More generally, any preconfigured security credential information may be used as key, to obtain quick admission at a base station involved in the multi-cell scheduling allocation. For example, a layer 3 security credential and/or a UE or subscriber identity may be used. Responsively, phase 4110, base station BS2 may provide a backward indication to base station BS1, informing BS1 it may deactivate the resource allocation to user equipment UE as the user equipment is now served by base station BS2.

In phase 4120, the transmission session is active between user equipment UE and base station BS2. In phase 4130, responsive to a determination in base station BS2 that user equipment UE is approaching an inter-base station handover to base station BS3, which is the first-hop target base station from base station BS2, base station BS2 transmits a first-hop forward indication to base station BS3. Responsively, base station BS3 may activate the allocation of resources to user equipment UE in a cell controlled by base station BS3.

In phase 4140, user equipment UE accesses base station BS3 using a key provided in connection with informing the UE of the multi-cell scheduling allocation. Responsively, phase 4150, base station BS3 may provide a backward indication to base station BS2, informing BS2 it may deactivate the resource allocation to user equipment UE as the user equipment is now served by base station BS3. In phase 4160, the transmission session is active between user equipment UE and base station BS3.

The indication phases of 480, 490, 4110, 4130 and 4150 are optional in the sense that they are not present in all embodiments. On the other hand, in some embodiments these indication phases are present while key access phases 4100 and 4140 are absent. In yet further embodiments, the indication phases and key access phases are both present.

Figure 5:
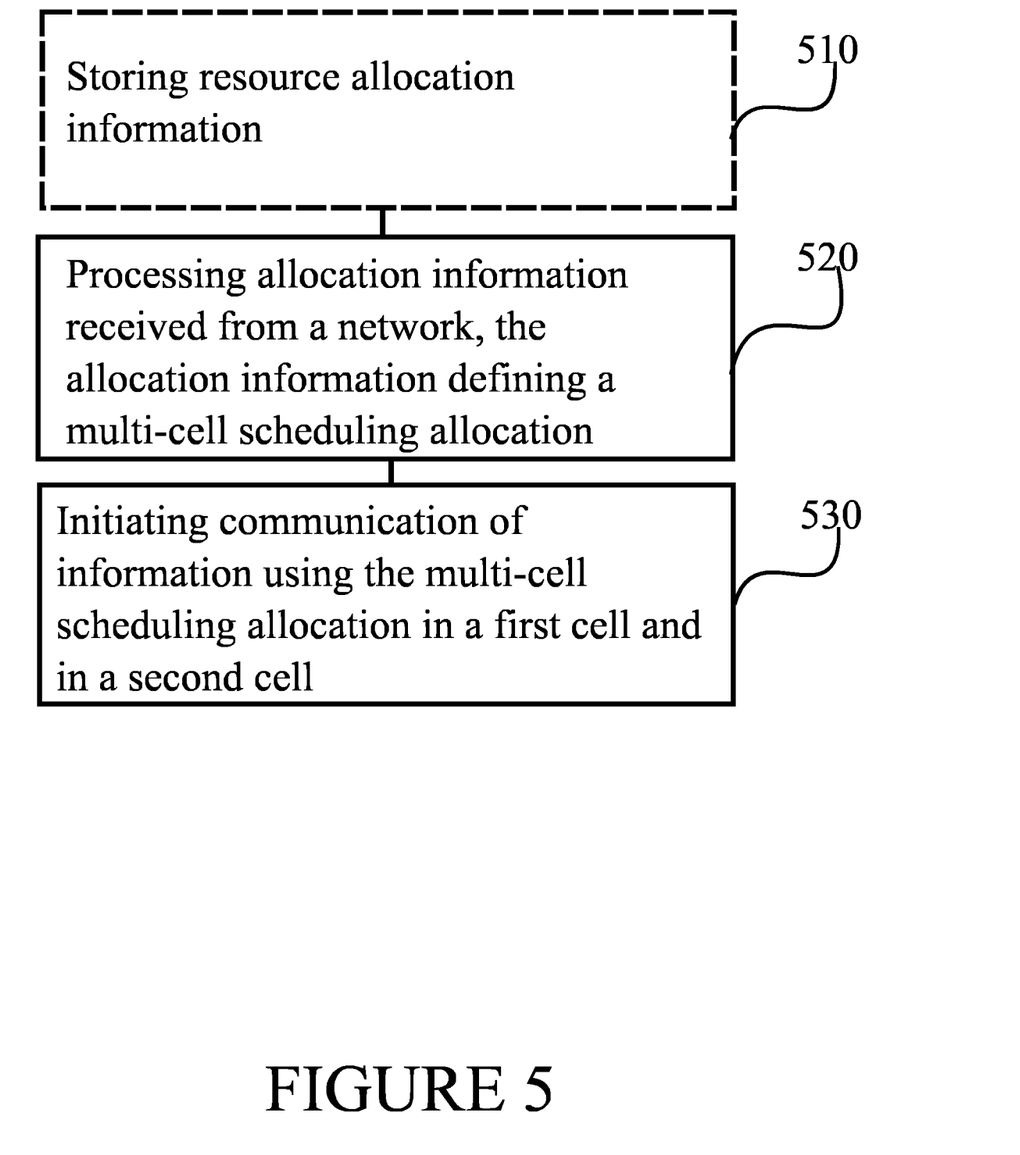
FIG. 5 is a flow graph of a method in accordance with at least some embodiments of the present invention.

FIG. 5 is a flow graph of a method in accordance with at least some embodiments of the present invention. The phases of the illustrated method may be performed in UE 110, or in a control device configured to control the functioning thereof, when installed therein.

Optional phase 510 comprises storing resource allocation information, which may comprise storing dynamically, persistently or semi-persistently scheduled allocations, for example. Phase 520 comprises processing resource allocation information received from a network, the resource allocation information defining a multi-cell scheduling allocation. Phase 530 comprises causing communication of information using the multi-cell scheduling allocation in a first cell and in a second cell.

Figure 6:
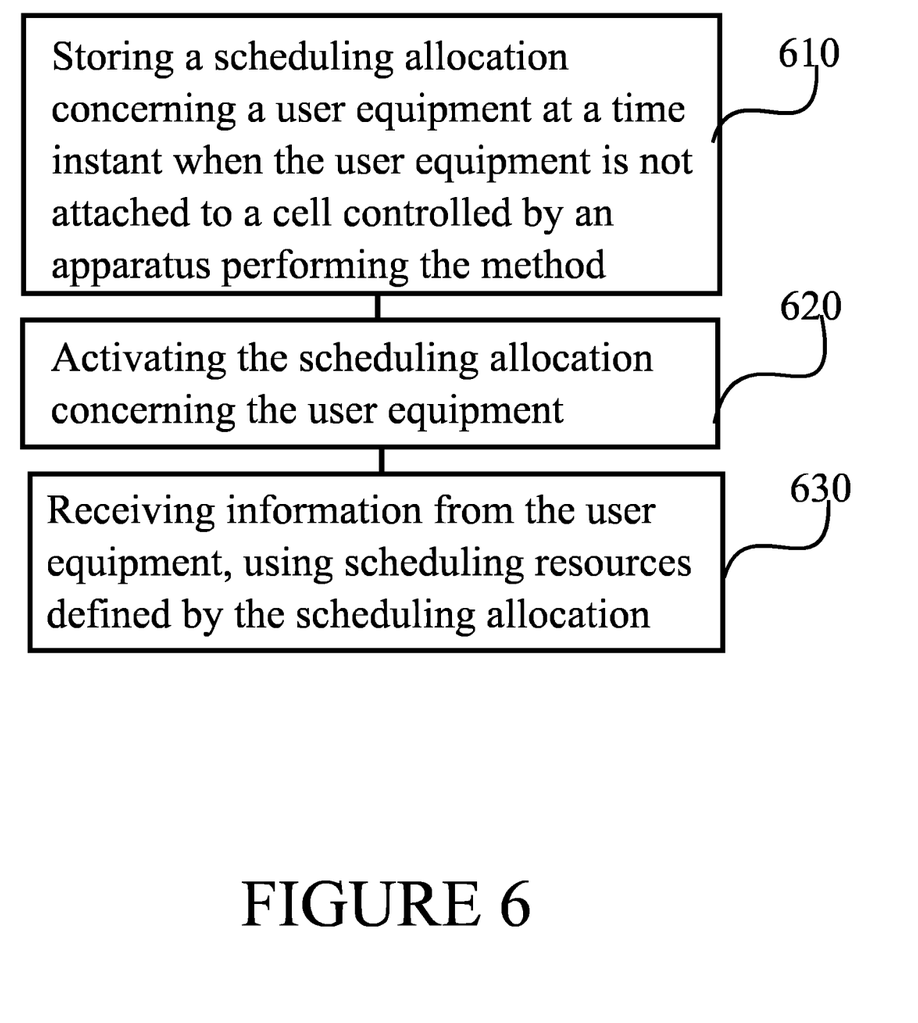
FIG. 6 is a flow graph of a method in accordance with at least some embodiments of the present invention.

FIG. 6 is a flow graph of a method in accordance with at least some embodiments of the present invention. The phases of the illustrated method may be performed in a base station, or in a control device configured to control the functioning thereof, when installed therein.

Phase 610 comprises storing a scheduling allocation concerning a user equipment at a time instant when the user equipment is not attached to a cell controlled by an apparatus performing the method. Phase 620 comprises activating the scheduling allocation concerning the user equipment. Finally, phase 630 comprises receiving information from the user equipment, using scheduling resources defined by the scheduling allocation.

Figure 7:
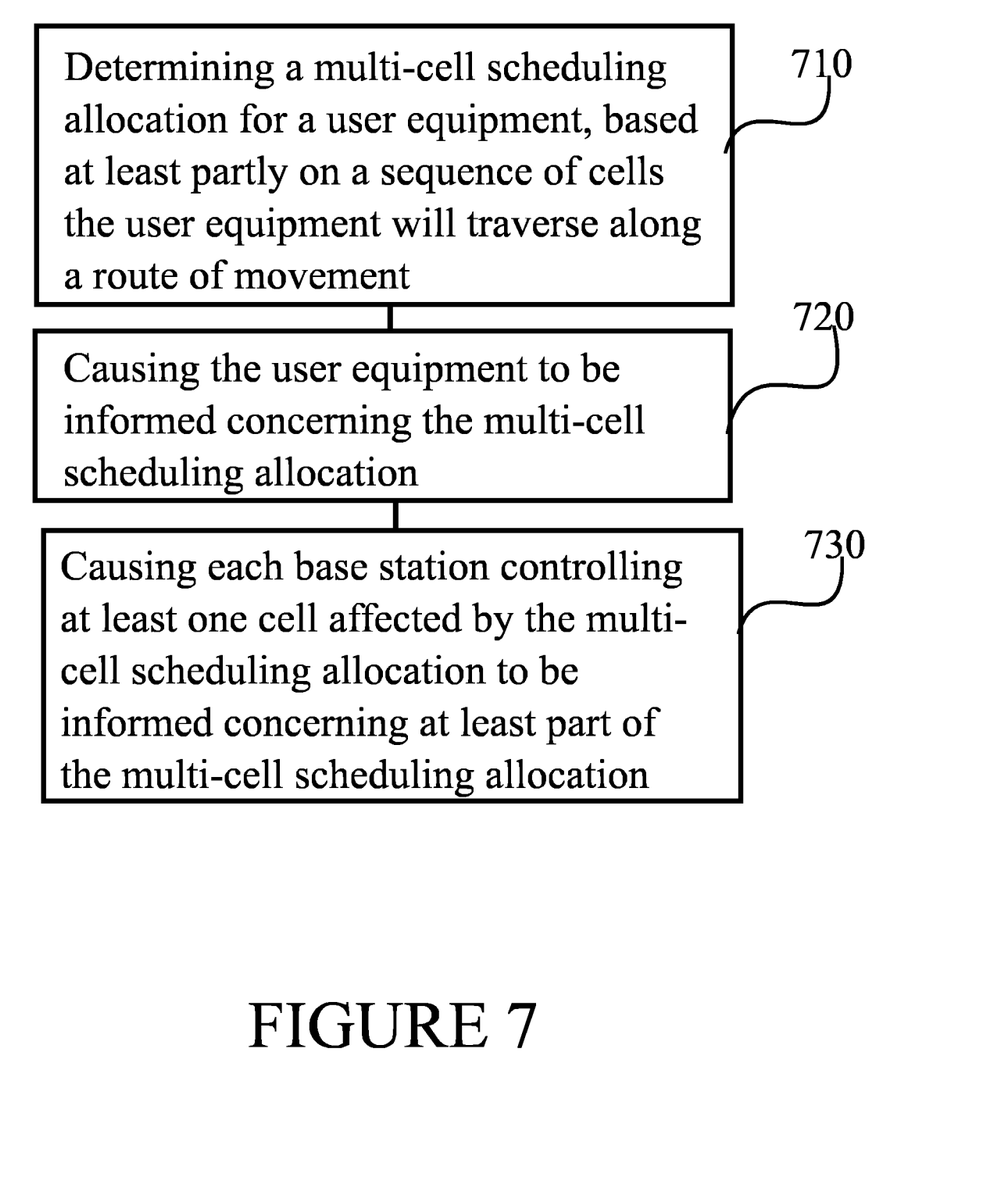
FIG. 7 is a flow graph of a method in accordance with at least some embodiments of the present invention.

FIG. 7 is a flow graph of a method in accordance with at least some embodiments of the present invention. The phases of the illustrated method may be performed in a core network node, or in a control device configured to control the functioning thereof, when installed therein.

Phase 710 comprises determining a multi-cell scheduling allocation for a user equipment, based at least partly on a sequence of cells the user equipment will traverse along a route of movement. Phase 720 comprises causing the user equipment to be informed concerning the multi-cell scheduling allocation. Finally, phase 730 comprises causing each base station controlling at least one cell affected by the multi-cell scheduling allocation to be informed concerning at least part of the multi-cell scheduling allocation.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing cellular resources, for example for fast moving user equipments.

ACRONYMS LIST eNB Evolved node-B (LTE base station)
HO Handover
LTE Long term evolution
MBB Mobile broadband
MME Mobility management entity
MTC Machine-type communications
PCDDH Physical downlink control channel
RACH Random access channel
RNTI Radio network temporary identifier
SPS Semi-persistent scheduling
UE User equipment
WCDMA Wideband code division multiple access
WLAN wireless local area network
WiMAX Worldwide interoperability for microwave access

REFERENCE SIGNS LIST

| | |
|---|---|
| 110 | UE |
| 120, 130 | Base stations |
| 140 | First core network node |
| 150 | Second core network node |
| 160 | Third core network node |
| 101, 102, 103, 104 | Cells |
| 124, 145, 165, 136 | Connections |
| 123 | Inter-base station connection |
| 210, 220, 230, 240, 250, 250, 260, 270, 280, 290, 2100, 2110 | Base stations (FIG. 2) |
| 212, 223, 254, 276, 287, 219, 2111 | Inter-base station connections (FIG. 2) |
| 210CN, 240CN, 260CN, 290CN | Core network connections (FIG. 2) |
| 300-360 | Structure of the device of FIG. 3 |
| 410-4160 | Phases of the method illustrated in FIG. 4 |
| 510-530 | Phases of the method illustrated in FIG. 5 |
| 610-630 | Phases of the method illustrated in FIG. 6 |
| 710-730 | Phases of the method illustrated in FIG. 7 |

The invention claimed is:

1. An apparatus, comprising:
a memory configured to store allocation information; and
at least one processing core configured to:
process resource allocation information received from a network, the resource allocation information defining a multi-cell scheduling allocation; and
cause communication of information using the multi-cell scheduling allocation in a first cell and in a second cell, wherein the multi-cell scheduling allocation is based at least partly on a sequence of cells a user equipment will traverse along a route of movement.

2. The apparatus according to claim 1, wherein the resource allocation information defines a semi-persistent multi-cell scheduling allocation.

3. The apparatus according to claim 1, wherein the resource allocation information defines a first routing path and a second routing path, and the apparatus is configured to use the first routing path in the first cell and the second routing path in the second cell.

4. The apparatus according to claim 3, wherein the first routing path comprises a first path to a core network and the second routing path comprises a second path to the core network different from the first path to the core network.

5. The apparatus according to claim 1, wherein the apparatus is configured to store a key and to use the key to access the second cell.

6. The apparatus according to claim 5, wherein the key comprises at least one of: a layer-1 bit sequence, a layer 3 security credential, a user-equipment identity, or a subscriber identity.

7. The apparatus according to claim 5, wherein the apparatus is configured to trigger activation of the multi-cell scheduling allocation in the second cell by accessing the second cell with the key.

8. The apparatus according to claim 1, wherein the at least one processing core is configured to determine, for the first cell and the second cell, scheduling resources at least partly based on the resource allocation information.

9. The apparatus according to claim 1, wherein the resource allocation information defines scheduling resources to be at least partly common in the first cell and the second cell.

10. The apparatus according to claim 1, wherein the resource allocation information defines first scheduling resources the apparatus is to use in the first cell, and wherein the resource allocation information defines second scheduling resources the apparatus is to use in the second cell.

11. The apparatus according to claim 1, wherein the first cell and the second cell are a source cell and a target cell in a predicted handover.

12. An apparatus comprising at least one processing core and at least one memory including computer program code, the at least one memory and the computer program code being configured to, with the at least one processing core, cause the apparatus at least to:
store a scheduling allocation concerning a user equipment at a time instant when the user equipment is not attached to a cell controlled by the apparatus;
activate the scheduling allocation concerning the user equipment; and
receive information from the user equipment, using scheduling resources defined by the scheduling allocation, wherein the scheduling allocation comprises a multi-cell scheduling allocation.

13. The apparatus according to claim 12, wherein the multi-cell scheduling allocation is based at least partly on a sequence of cells a user equipment will traverse along a route of movement.

14. The apparatus according to claim 12, wherein the apparatus is configured to activate the scheduling allocation responsive to receipt from the user equipment of a key indicating the user equipment is entering the cell controlled by the apparatus.

15. The apparatus according to claim 12, wherein the apparatus is configured to activate the scheduling allocation responsive to receipt from a source base station device of an indication the user equipment is about to enter the cell controlled by the apparatus.

16. The apparatus according to claim 12, wherein the apparatus is configured to provide a forward indication to a target base station device that the user equipment is about to enter a cell controlled by the target base station device.

17. The apparatus according to claim 12, wherein the apparatus is configured to provide a forward indication to a second-hop target base station device that the user equipment is about to enter a cell controlled by the second-hop target base station device via at least one intermediate cell.

18. The apparatus according to claim 12, wherein the apparatus is configured to provide a backward indication to a source base station device responsive to the user equipment entering the cell controlled by the apparatus from a cell controlled by the source base station.

19. An apparatus comprising at least one processing core and at least one memory including computer program code, the at least one memory and the computer program code being configured to, with the at least one processing core, cause the apparatus at least to:
determine a multi-cell scheduling allocation for a user equipment, based at least partly on a sequence of cells the user equipment will traverse along a route of movement;
cause the user equipment to be informed concerning the multi-cell scheduling allocation; and
cause each base station controlling at least one cell affected by the multi-cell scheduling allocation to be informed concerning at least part of the multi-cell scheduling allocation.

20. The apparatus according to claim 19, wherein the multi-cell scheduling allocation comprises at least two data routing paths from base station devices to a core network.

* * * * *